Nov. 10, 1964  A. B. DENNEY ETAL  3,156,214
AUTOMATIC FISH FEEDER
Filed Aug. 8, 1963  2 Sheets-Sheet 1
FIG. 1
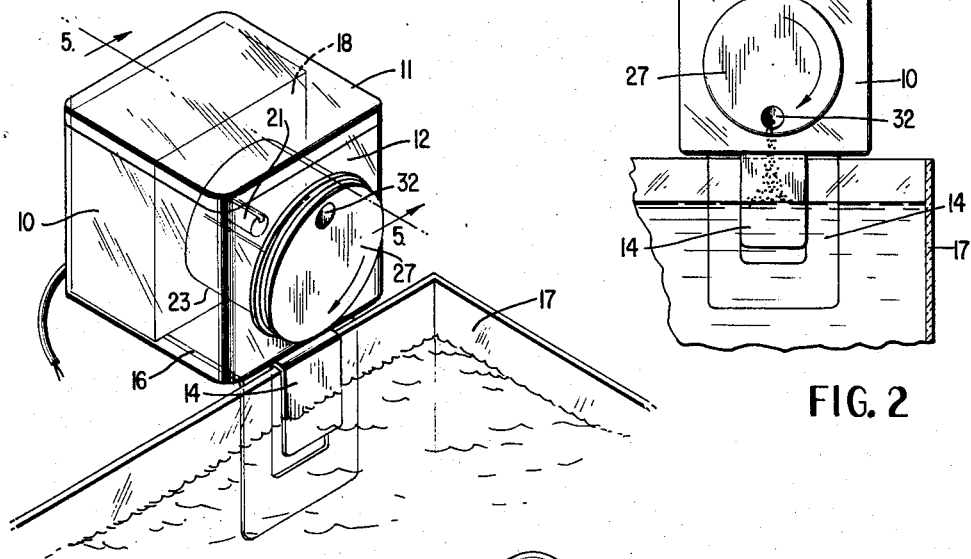
FIG. 2
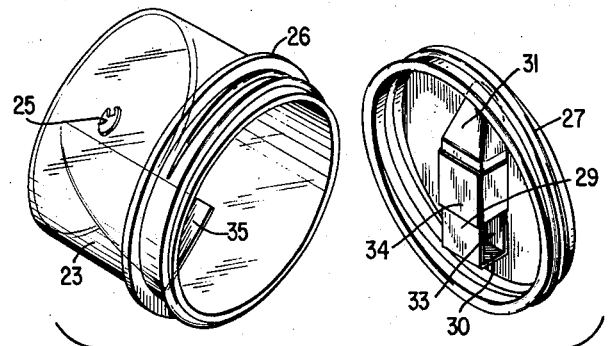
FIG. 3
FIG. 4
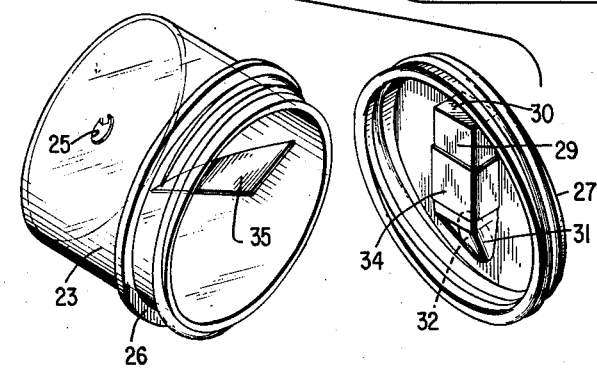
INVENTORS.
ALBERT B. DENNEY
HARRELL E. GORDON
BY
ATTORNEY

INVENTORS.
ALBERT B. DENNEY
HARRELL E. GORDON

United States Patent Office 3,156,214
Patented Nov. 10, 1964

3,156,214
AUTOMATIC FISH FEEDER
Albert B. Denney, P.O. Box 3006, Colonial Station, Waco, Tex., and Harrell E. Gordon, P.O. Box 3011, Colonial Station, Waco, Tex.
Filed Aug. 8, 1963, Ser. No. 300,723
1 Claim. (Cl. 119—51)

This invention relates to improvements in automatic fish feeders.

The object of the invention is to provide an automatic fish feeder in the nature of an attachment to an aquarium tank or the like which will supply food to the fish therein at predetermined and adjustable regular time intervals while maintaining the food clean and dry at all times.

Another object is to provide an automatic fish feeder having novel and simplified means to regulate the amount of fish food dispensed during each dispensing operation.

Another important object is to provide a fish feeder which is highly simplified, compact, efficient in operation and so constructed that it may be placed on the market at a relatively low cost compared to the more complex mechanisms commonly employed for the same purpose.

Still another object is to provide a fish feeder which may supply food for an aquarium in a controlled manner for 30 days or longer without the necessity for intermittently filling.

Other objects and advantages of the invention will be apparent during the course of the following detailed description.

Figure 5:
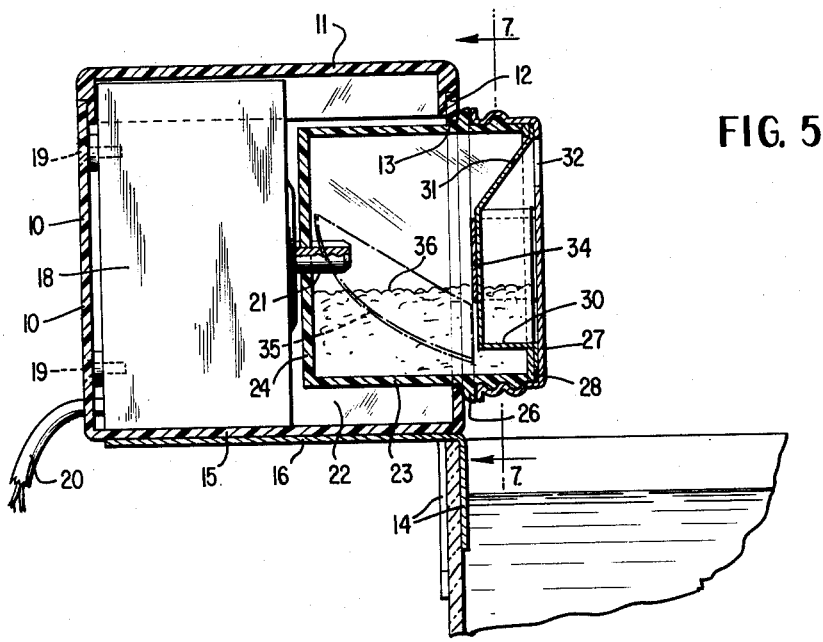
Figure 6:
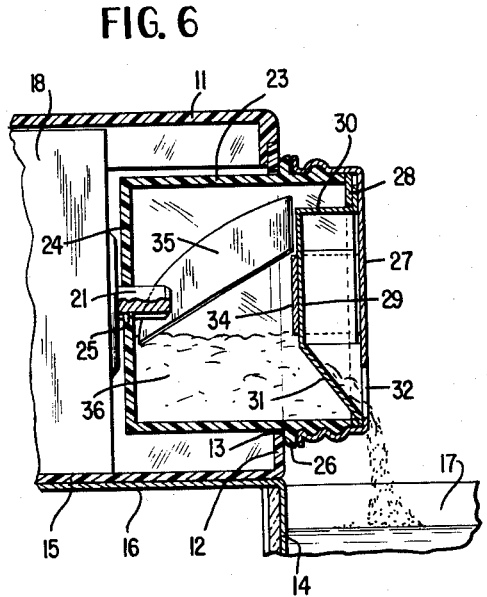
Figure 7:
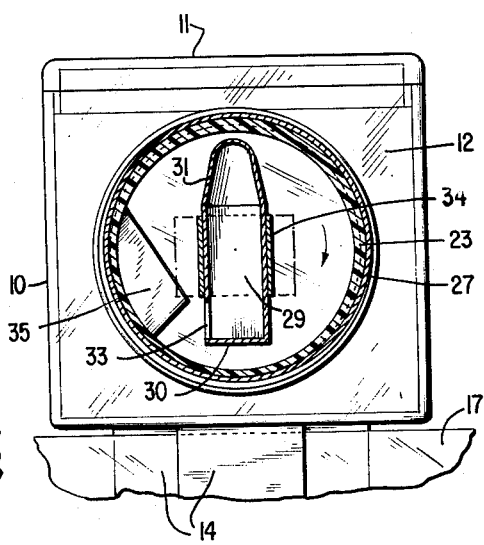

In the accompanying drawings forming a part of this application and in which like numerals are employed to designate like parts throughout the same, FIGURE 1 is a perspective view of the automatic fish feeder embodying the invention installed upon a tank, FIGURE 2 is a front elevation of the feeder showing the dispensing operation, FIGURES 3 and 4 are exploded perspective views of the rotary feed container, feed regulator and associated elements, FIGURE 5 is an enlarged central vertical section taken on line 5—5 of FIGURE 1, FIGURE 6 is a fragmentary sectional view similar to FIGURE 5 but showing the feed container and regulating and dispensing means in the dispensing position, and FIGURE 7 is a transverse vertical section taken on line 7—7 of FIGURE 5.

In the drawings, wherein for the purpose of illustration is shown a preferred embodiment of the invention, the numeral 10 designates a preferably plastic rectangular box or housing having a removable cover 11 and a front vertical wall 12 provided with a large central opening 13. A spring clip 14 is suitably secured to the bottom wall 15 of housing 10 through an extension plate 16 of the clip. The clip 14 is engageable over the top edge of one wall of an aquarium or tank 17 which contains the fish to be fed. The entire fish feeder is thus bodily mounted upon the tank 17 through the medium of the simple clip 14.

A conventional electrical clock motor 18 is mounted within the rear portion of plastic housing 10 and suitably rigidly secured therein by screws 19 or the like. The electrical cord 20 leading from the clock motor passes through a small opening in the back wall of the housing 10, as shown. The clock motor is provided with the usual manual adjusting and regulating means, not shown, and such means may project outside of the housing 10, if desired. The substantially closed housing 10 receives and holds a certain amount of heat generated by the clock motor and this heat is utilized to maintain the fish food dry at all times, and this constitutes one of the novel features of the invention. The clock motor shaft 21 projects forwardly of the motor and into the forward portion or chamber 22 of the plastic housing.

A cylindrical feed container and tumbler 23 formed of plastic is provided and projects into the forward chamber 22 of the housing and has its rear wall 24 provided with a central opening 25 adapted to receive the motor shaft 21 and keyed thereto for rotation therewith. The cylindrical container 23 extends through the large opening 13 and has a relatively close fit therein but is freely rotatable with the shaft 21 on the horizontal axis thereof. The container 23 projects somewhat forwardly of the housing front wall 12 and is preferably provided with an annular flange 26, slidably engaging the outer face of the front wall 12. The container 23 has its forward end open, and this end is normally covered by a closure cap or feed retainer 27 which may have screw-threaded engagement with the container 23, as shown. A suitable gasket 28 is interposed between the mouth of the container 23 and the cap 27.

Suitably secured to the inner face of the cap 27 and extending diametrically thereof is a combined feed regulator and discharge chute 29 formed of suitable material such as plastic or sheet metal. The regulator 29 is rectangular in cross section and has a closed end wall 30 at one end thereof and the opposite end of the regulator is shaped to form a cone-like discharge nozzle 31, in registration with a discharge opening 32 in the cap 27 near the periphery thereof. One side wall of the regulator 29 has a feed inlet opening 33 formed therethrough adjacent the end wall 30, and the remainder of the regulator is closed on all sides. A longitudinally shiftable generally channel-shaped valve element 34 is slidably mounted upon the regulator 29 and is shiftable manually upon the regulator into covering or uncovering relation with the intake opening 33 or to any desired intermediate position for partially uncovering this opening. The regulator valve element 34 will remain in the selected adjusted position on the regulator 29 by frictional engagement therewith. The positioning of the valve element 34 on the feed regulator 29 and its relation to the feed intake opening 33 determines the quantity of feed which enters the regulator 29 upon each revolution of the feed container, and consequently also determines the quantity which will be dispensed through the discharge opening 32 upon each revolution.

A deflector baffle 35 is fixedly secured within the container 23 and projects radially inwardly from the cylindrical side wall thereof at an oblique angle to the axis of rotation of the feed container on the shaft 21. This baffle serves to tumble the fish food 36 within the container during rotation, and also serves to funnel or channel the feed into the intake opening 33 during rotation in the direction of the arrow, FIGURE 7, when the opening 33 is at the bottom side of the container 23 and the regulator 29 is substantially vertically disposed.

In use, the cap or cover 27 is removed so that the container 23 may be filled with a suitable quantity of fish food in dry granular or flaky form. The slidable valve element 34 is positioned upon the regulator 29 to uncover the intake opening 33 a desired amount. The cover 27 is then applied firmly to the container 23 and the container is engaged with the clock motor shaft 21 as shown in the drawings. The clock motor is started and the feed container and tumbler 23 is revolved with the shaft 21 twice during a 24-hour day.

Each time that the intake opening 33 assumes the lowermost position clearly in FIGURE 7 while turning in the direction of the arrow, a small charge of feed will be guided into this opening and scooped up by the feed regulator 29, and the baffle 35 aids in this operation as previously mentioned, while the setting of the slide valve element 34 determines the effective size of the opening 33 and therefore the amount of feed which can enter the regulator. At this time, the nozzle 31 and discharge opening 32 are at the top of the container 23 and inactive, as shown in FIGURES 1 and 5. Further turning of the container 23 and associated elements in the direction of the arrow will ultimately place the discharge opening 32 at the bottom of the apparatus, FIGURES 2 and 6, and when this occurs, the small charge of feed within the regulator 29 will be dispensed by gravity through the discharge opening and will fall into the tank 17. At this time, the intake opening 33 is positioned at the top of the apparatus and above the level of the feed in the container 23.

This cycle of operation may be continuous and the fish feeder is capable of supplying accurately measured amounts of feed to the aquarium for long periods and completely automatically without the necessity for intermittent refilling. The heat from the motor 18 confined within the housing 10 serves to keep the feed in the container 23 dry so that there is no tendency for the feed to clog in the regulator 29 or to form into a solid mass in the rotary container.

The device is highly simplified and very economical to construct and the parts are easily separated for cleaning, filling and other servicing. The unit is very compact and neat and attractive in appearance and lightweight. Quite obviously, the device can be manufactured in various sizes to meet the needs of large and small aquariums and the like.

It is to be understood that the form of the invention herewith shown and described is to be taken as a preferred example of the same, and that various changes in the size, shape and arrangement of parts may be resorted to, without departing from the spirit of the invention or scope of the subjoined claim.

Having thus described our invention, we claim:

An automatic fish feeder comprising a main housing attachable to a wall of an aquarium tank and having a side wall opening, an electric motor mounted within the main housing near one side wall thereof and spaced from the side wall opening, there being a relatively large interior chamber within the main housing between said motor and said side wall opening, said chamber adapted to be heated by the heat generated by said motor, said motor having a shaft projecting into said chamber substantially coaxially with the side wall, a feed cylinder journaled for rotation within said side wall opening and having its major portion disposed within the confines of said interior chamber in spaced relation to the side walls thereof, whereby heat in said chamber substantially surrounds said cylinder, said cylinder detachably secured to said motor shaft to turn slowly therewith, said cylinder projecting somewhat forwardly of said side wall opening and main housing in overhanging relation to the aquarium tank, and adjustable feed regulator and discharge means on the forward overhanging portion of said cylinder to supply feed intermittently from the cylinder to the aquarium tank during slow rotation of the cylinder with the motor shaft.

References Cited in the file of this patent

UNITED STATES PATENTS

| | | |
|---|---|---|
| 2,665,036 | Riva | Jan. 5, 1954 |
| 3,091,371 | Marx et al. | May 28, 1963 |